US008629192B2

(12) United States Patent
Merrigan et al.

(10) Patent No.: US 8,629,192 B2
(45) Date of Patent: *Jan. 14, 2014

(54) METHOD FOR THE PRODUCTION OF HIGH INTERNAL PHASE EMULSION FOAMS USING ULTRAVIOLET LIGHT

(75) Inventors: Steven Ray Merrigan, West Chester, OH (US); Thomas Allen Desmarais, Cincinnati, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 476 days.

This patent is subject to a terminal disclaimer.

(21) Appl. No.: 12/794,945

(22) Filed: Jun. 7, 2010

(65) Prior Publication Data

US 2011/0160320 A1    Jun. 30, 2011

Related U.S. Application Data (60) Provisional application No. 61/290,947, filed on Dec. 30, 2009.

(51) Int. Cl.
*C08J 3/28* (2006.01)
*C08J 9/00* (2006.01)

(52) U.S. Cl.
USPC ............. 521/50.5; 521/50; 521/99; 521/82; 521/142; 522/84; 522/113; 522/120; 522/121; 427/243; 427/244; 427/245; 427/247

(58) Field of Classification Search
USPC ......... 521/50, 50.5, 99, 82, 142; 522/84, 113, 522/120, 121; 427/243, 244, 245, 247
See application file for complete search history.

(56) References Cited

U.S. PATENT DOCUMENTS

| | | | |
|---|---|---|---|
| 3,854,864 A | 12/1974 | Mendoza | |
| 3,988,508 A | 10/1976 | Lissant | |
| 4,029,622 A | 6/1977 | Keller et al. | |
| 4,196,527 A | 4/1980 | Escande | |
| 4,378,278 A | 3/1983 | Allaway et al. | |
| 5,149,720 A | 9/1992 | Desmarais et al. | |
| 5,189,070 A | 2/1993 | Brownscombe et al. | |
| 5,210,104 A | 5/1993 | Bass et al. | |
| 5,252,619 A | 10/1993 | Brownscombe et al. | |
| 5,290,820 A | 3/1994 | Brownscombe et al. | |
| 5,306,733 A | 4/1994 | Adamski et al. | |
| 5,306,734 A | 4/1994 | Bass et al. | |
| 5,306,831 A | 4/1994 | Beshouri et al. | |
| 5,334,621 A | 8/1994 | Beshouri | |
| 5,340,842 A | 8/1994 | Adamski et al. | |
| 5,358,974 A | 10/1994 | Brownscombe et al. | |
| 5,362,762 A | 11/1994 | Beshouri | |
| 5,394,738 A | 3/1995 | Bass et al. | |
| 5,634,281 A | 6/1997 | Nugent | |
| 5,646,193 A | 7/1997 | Brownscombe et al. | |
| 5,670,101 A | 9/1997 | Nathoo et al. | |
| 5,817,704 A * | 10/1998 | Shiveley et al. ............... 521/63 |
| 5,827,909 A | 10/1998 | Desmarais | |
| 5,912,276 A | 6/1999 | Adamski et al. | |
| 6,057,376 A | 5/2000 | Bass et al. | |
| 6,103,645 A | 8/2000 | Chang et al. | |
| 6,166,097 A | 12/2000 | Yonemura et al. | |
| 6,274,638 B1 | 8/2001 | Yonemura et al. | |
| 6,323,250 B1 | 11/2001 | Kadonaga et al. | |
| 6,362,243 B1 | 3/2002 | Sasabe et al. | |
| 6,365,642 B1 * | 4/2002 | Dyer et al. ...................... 521/64 |
| 6,395,792 B1 | 5/2002 | Nagasuna et al. | |
| 6,395,793 B1 | 5/2002 | Kadonaga et al. | |
| 6,525,106 B1 | 2/2003 | Desmarais et al. | |
| 6,573,305 B1 | 6/2003 | Thunhorst et al. | |
| 6,630,519 B2 | 10/2003 | Fujimaru et al. | |
| 6,649,665 B2 | 11/2003 | Kadonaga et al. | |
| 6,730,711 B2 | 5/2004 | Sasabe et al. | |
| 6,730,712 B2 | 5/2004 | Sasabe et al. | |
| 6,750,263 B2 | 6/2004 | Sasabe et al. | |
| 6,759,080 B2 * | 7/2004 | Thunhorst et al. ........... 521/50.5 |
| 6,765,029 B2 | 7/2004 | Sasabe et al. | |
| 6,797,735 B2 | 9/2004 | Nagasuna et al. | |
| 6,822,010 B2 | 11/2004 | Fujimaru et al. | |
| 6,846,439 B2 | 1/2005 | Kadonaga et al. | |
| 6,890,963 B2 * | 5/2005 | Clear et al. ................... 521/50.5 |
| 7,001,548 B2 | 2/2006 | Sakamoto et al. | |
| 7,304,312 B2 | 12/2007 | Hopaluk et al. | |
| 7,649,186 B2 | 1/2010 | Kabuki et al. | |
| 2002/0022672 A1 * | 2/2002 | Thunhorst et al. ........... 521/50.5 |
| 2006/0025521 A1 | 2/2006 | Frenz et al. | |
| 2006/0210785 A1 * | 9/2006 | Takada et al. .............. 428/304.4 |

FOREIGN PATENT DOCUMENTS

GB        1478987 A        7/1977

OTHER PUBLICATIONS

Metallic Reflector Coatings Data Sheet from Oriel Instruments. [retrived online on Apr. 19, 2013] Retrieved from internet URL:<http://www.molalla.com/members/leeper/refcoat.pdf>.*
Optical Thin film Consulting: High Reflectors [retrived onlin Apr. 19, 2013] Retrived from internet URL:<http://www.kruschwitz.com/HR's.htm>.*
Zhang, L., et al., "Photoinitiated Copolymerization of Acrylamide and Styrene in Oil-in-Water Microemulsion," Journal of Applied Polymer Science, vol. 66, pp. 2543-2549 (1997).
Apen, "Polymeric Foam by Photoinitiated Polymerization of Trimethylolpropanetriacrylate: Initiate and Solvent Effects," Journal of Cellular Plastics, vol. 31, pp. 74-92 (1995).

(Continued)

*Primary Examiner* — Sanza McClendon (74) *Attorney, Agent, or Firm* — Andres E. Velarde; James Oehlenschlager (57) ABSTRACT

A method of producing a HIPE foam using Ultraviolet (UV) light to polymerize a High Internal Phase Emulsion (HIPE) having two or more layers. The method uses UV light to polymerize HIPEs having two or more layers wherein each of the layers comprises a continuous oil phase containing monomers, photoinitiator, and an aqueous phase.

14 Claims, 2 Drawing Sheets

(56) References Cited

OTHER PUBLICATIONS

Ghosh, S.K., et al., "Inverse Emulsion Polymerization of Acrylamide Using the Oil-Soluble Photoinitiator 2,2-Dimethoxy-2-Phenyl Acetophenone (DMPA)," Polymer Science: Recent Advances, vol. 2, pp. 9-14 (1994).

Apen, et al., "Bromaine-Containing Polymeric Foams," Journal of Cellular Plastics, vol. 28, pp. 557-570 (1992).

Stannett, V., et al., "Kinetics of the Radiation-Induced Polymerization of Styrene in Emulsion," Journal of Colloid and Interface Science, vol. 71, No. 1, pp. 130-140 (1979).

* cited by examiner

METHOD FOR THE PRODUCTION OF HIGH INTERNAL PHASE EMULSION FOAMS USING ULTRAVIOLET LIGHT

CROSS-REFERENCE TO RELATED APPLICATIONS

This application claims the benefit of U.S. Provisional Application No. 61/290,947 filed on 30 Dec. 2009, the substance of which is incorporated herein by reference.

FIELD OF THE INVENTION

This application relates to a process for the production of High Internal Phase Emulsion (HIPE) foam using ultraviolet light.

BACKGROUND OF THE INVENTION

An emulsion is a dispersion of one liquid in another liquid and generally is in the form of a water-in-oil mixture having an aqueous or water phase dispersed within a substantially immiscible continuous oil phase. Water-in-oil (or oil in water) emulsions having a high ratio of dispersed aqueous phase to continuous oil phase are known in the art as High Internal Phase Emulsions, also referred to as "HIPE" or HIPEs. At relatively high dispersed aqueous phase to continuous oil phase ratios the continuous oil phase becomes essentially a thin film separating and coating the droplet-like structures of the internal, dispersed aqueous phase. The continuous oil phase of a water-in-oil HIPE generally comprises one or more polymerizable monomers. These monomers can be polymerized, forming a cellular structure, for example a foam, having a cell size distribution defined by the size distribution of the dispersed, aqueous phase droplets.

Polymerization of monomers in a HIPE usually involves the application of thermal energy or heat. The HIPE can be subjected to heat in an enclosed area, such as an oven; and the heat source can be varied, such as steam or direct application of heat through one or more heating elements. However there are several significant drawbacks to using heat alone for curing HIPEs. A HIPE usually has a large surface area and the unequal application of heat to such a large surface can cause defects in the resulting HIPE foam, such as dimpling, shrinkage, and edge curls. Further, whatever form the heat application takes such application is usually quite expensive in energy and monetary costs, as the heat being applied to a HIPE usually has a temperature ranging from around 50° C. to 150° C. An additional drawback to the use of heat alone to polymerize HIPEs is that an enclosed area, such as an oven, is required to keep the heat from escaping into the environment and reducing the amount of heat applied to the HIPE. This need for an oven further increases the cost of producing HIPE foams and takes up a large amount of physical space on the HIPE foam production line.

Attempts in the past to move away from the use of heat to polymerize HIPEs have used ultraviolet (UV) light to polymerize HIPEs into foams. However, these methods have had problems, such as a reliance on the use of polyelectrolytes in the HIPE which can lead to undesirable properties in the resulting HIPE foam, as polyectrolytes are trapped in the polymer backbone, whether through entanglements; polymerized in, via chain transfer reactions; or simply absorbed onto the surface of the HIPE foam struts. The polyelectrolytes thus incorporated into the HIPE foam change the physical properties of the foam, typically decreasing the strength and increasing friability of the resulting HIPE foam. Further, these methods have not been usable on thicker HIPEs and preferentially polymerize the monomers on the surface of the HIPE exposed to the source of the UV light, leaving the bulk of the HIPE unpolymerized. Accordingly, there is a need for a method of HIPE polymerization using UV light that overcomes the problems in the prior art.

SUMMARY OF THE INVENTION

A method for producing a High Internal Phase Emulsion foam is provided that comprises forming a first High Internal Phase Emulsion from an oil phase comprising monomer, cross-linking agent, emulsifier; an aqueous phase; and a photoinitiator. Forming a second High Internal Phase Emulsion from an oil phase comprising: monomer, cross-linking agent, emulsifier; an aqueous phase; and a photoinitiator. The first High Internal Phase Emulsion is deposited on a belt. The second High Internal Phase Emulsion is then deposited on the first High Internal Phase Emulsion. A source of UV light is provided and the first and second High Internal Phase Emulsion are exposed to the UV light.

A method for producing a High Internal Phase Emulsion foam is provided that comprises providing an aqueous phase; a first oil phase having monomer, cross-linking agent, emulsifier; and a photoinitiator; and providing a second oil phase having monomer, cross-linking agent, emulsifier; and a photoinitiator. The aqueous phase is combined with the first oil phase and photoinitiator and the aqueous phase, first oil phase, and photoinitiator are then emulsified to form a first High Internal Phase Emulsion. The aqueous phase is combined with the second oil phase and photoinitiator and the aqueous phase, second oil phase, and photoinitiator are then emulsified to form a second High Internal Phase Emulsion. The first High Internal Phase Emulsion is then deposited on a belt and the second High Internal Phase Emulsion is deposited on the first High Internal Phase Emulsion. A source of UV light is provided and the first and second High Internal Phase Emulsion are exposed to the UV light.

DETAILED DESCRIPTION OF THE INVENTION

The present invention relates to a method of using Ultraviolet (UV) light to polymerize a High Internal Phase Emulsion (HIPE) having two or more layers. The method uses UV light to polymerize HIPEs having two or more layers wherein each of the layers comprises a continuous oil phase containing monomers and an aqueous phase. The HIPEs are produced using a continuous process, for example by having a HIPE deposited on a belt, such as an endless belt. While on the belt the HIPE is moved to a UV light zone, where the monomers are polymerized to form a HIPE foam. The HIPE foams produced from the method of the present invention are useful for the absorption of liquid materials.

A High Internal Phase Emulsion (HIPE) comprises two phases. One phase is a continuous oil phase comprising monomers that are polymerized to form a HIPE foam and an emulsifier to help stabilize the HIPE. The oil phase may also include one or more photoinitiators. The monomer component, which is capable of rapid UV light polymerization, may be present in an amount of from about 80% to about 99%, and in certain embodiments from about 85% to about 95% by weight of the oil phase. The emulsifier component, which is soluble in the oil phase and suitable for forming a stable water-in-oil emulsion may be present in the oil phase in an amount of from about 1% to about 20% by weight of the oil phase. The emulsion may be formed at an emulsification temperature of from about 20° C. to about 130° C. and in certain embodiments from about 50° C. to about 100° C.

In general, the monomers will include from about 20% to about 97% by weight of the oil phase at least one substantially water-insoluble monofunctional alkyl acrylate or alkyl methacrylate. For example, monomers of this type may include $C_4$-$C_{18}$ alkyl acrylates and $C_2$-$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate. In certain embodiments, blends of these monomers can provide the desired glass transition temperature (Tg) of the resulting HIPE foams.

The oil phase may also comprise from about 2% to about 40%, and in certain embodiments from about 10% to about 30%, by weight of the oil phase, a substantially water-insoluble, polyfunctional crosslinking alkyl acrylate or methacrylate. This crosslinking comonomer, or crosslinker, is added to confer strength and resilience to the resulting HIPE foam. Examples of crosslinking monomers of this type comprise monomers containing two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, and the like. Other examples of crosslinkers contain a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed.

Any third substantially water-insoluble comonomer may be added to the oil phase in weight percentages of from about 0% to about 15% by weight of the oil phase, in certain embodiments from about 2% to about 8%, to modify properties of the HIPE foams. In certain cases, "toughening" monomers may be desired which impart toughness to the resulting HIPE foam. These include monomers such as styrene, vinyl chloride, vinylidene chloride, isoprene, and chloroprene. Without being bound by theory, it is believed that such monomers aid in stabilizing the HIPE during polymerization (also known as "curing") to provide a more homogeneous and better formed HIPE foam which results in better toughness, tensile strength, abrasion resistance, and the like. Monomers may also be added to confer flame retardancy as disclosed in U.S. Pat. No. 6,160,028 (Dyer) issued Dec. 12, 2000. Monomers may be added to confer color, for example vinyl ferrocene, fluorescent properties, radiation resistance, opacity to radiation, for example lead tetraacrylate, to disperse charge, to reflect incident infrared light, to absorb radio waves, to form a wettable surface on the HIPE foam struts, or for any other desired property in a HIPE foam. In some cases, these additional monomers may slow the overall process of conversion of HIPE to HIPE foam, the tradeoff being necessary if the desired property is to be conferred. Thus, such monomers can be used to slow down the polymerization rate of a HIPE. Examples of monomers of this type comprise styrene and vinyl chloride.

The oil phase may further contain an emulsifier used for stabilizing the HIPE. Emulsifiers used in a HIPE can include: (a) sorbitan monoesters of branched $C_{16}$-$C_{24}$ fatty acids; linear unsaturated $C_{16}$-$C_{22}$ fatty acids; and linear saturated $C_{12}$-$C_{14}$ fatty acids, such as sorbitan monooleate, sorbitan monomyristate, and sorbitan monoesters, sorbitan monolaurate diglycerol monooleate (DGMO), polyglycerol monoisostearate (PGMIS), and polyglycerol monomyristate (PGMM); (b) polyglycerol monoesters of -branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (for example diglycerol monoesters of C18:1 fatty acids), diglycerol monomyristate, diglycerol monoisostearate, and diglycerol monoesters; (c) diglycerol monoaliphatic ethers of -branched $C_{16}$-$C_{24}$ alcohols, linear unsaturated $C_{16}$-$C_{22}$ alcohols, and linear saturated $C_{12}$-$C_{14}$ alcohols, and mixtures of these emulsifiers. See U.S. Pat. No. 5,287,207 (Dyer et al.), issued Feb. 7, 1995 and U.S. Pat. No. 5,500,451 (Goldman et al.) issued Mar. 19, 1996. Another emulsifier that may be used is polyglycerol succinate (PGS), which is formed from an alkyl succinate, glycerol, and triglycerol.

Such emulsifiers, and combinations thereof, may be added to the oil phase so that they comprise between about 1% and about 20%, in certain embodiments from about 2% to about 15%, and in certain other embodiments from about 3% to about 12% by weight of the oil phase. In certain embodiments, coemulsifiers may also be used to provide additional control of cell size, cell size distribution, and emulsion stability, particularly at higher temperatures, for example greater than about 65° C. Examples of coemulsifiers include phosphatidyl cholines and phosphatidyl choline-containing compositions, aliphatic betaines, long chain $C_{12}$-$C_{22}$ dialiphatic quaternary ammonium salts, short chain $C_1$-$C_4$ dialiphatic quaternary ammonium salts, long chain $C_{12}$-$C_{22}$ dialkoyl (alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic imidazolinium quaternary ammonium salts, long chain $C_{12}$-$C_{22}$ monoaliphatic benzyl quaternary ammonium salts, long chain $C_{12}$-$C_{22}$ dialkoyl(alkenoyl)-2-aminoethyl, short chain $C_1$-$C_4$ monoaliphatic benzyl quaternary ammonium salts, short chain $C_1$-$C_4$ monohydroxyaliphatic quaternary ammonium salts. In certain embodiments, ditallow dimethyl ammonium methyl sulfate (DTDMAMS) may be used as a coemulsifier.

Photoinitiators may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of from about 200 nanometers (nm) to about 800 nm, in certain embodiments from about 200 nm to about 350 nm, and in certain embodiments from about 350 nm to about 450 nm. If the photoinitiator is in the oil phase, suitable types of oil-soluble photoinitiators include benzyl ketals, α-hydroxyalkyl phenones, α-amino alkyl phenones, and acylphospine oxides. Examples of photoinitiators include 2,4,6-[trimethylbenzoyldiphosphine]oxide in combination with 2-hydroxy-2-methyl-1-phenylpropan-1-one (50:50 blend of the two is sold by Ciba Speciality Chemicals, Ludwigshafen, Germany as DAROCUR® 4265); benzyl dimethyl ketal (sold by Ciba Geigy as IRGACURE 651); α-,α-dimethoxy-α-hydroxy acetophenone (sold by Ciba Speciality Chemicals as DAROCUR® 1173); 2-methyl-1-[4-(methyl thio)phenyl]-2-morpholino-propan-1-one (sold by Ciba Speciality Chemicals as IRGACURE® 907); 1-hydroxycyclohexyl-phenyl ketone (sold by Ciba Speciality Chemicals as IRGACURE® 184); bis(2,4,6-trimethylbenzoyl)-phenylphosphineoxide (sold by Ciba Speciality Chemicals as IRGACURE 819); diethoxyacetophenone, and 4-(2-hydroxyethoxy)phenyl-(2-hydroxy-2-methylpropyl) ketone (sold by Ciba Speciality Chemicals as IRGACURE® 2959); and Oligo[2-hydroxy-2-methyl-1-[4-(1-methylvinyl) phenyl]propanone] (sold by Lamberti spa, Gallarate, Italy as ESACURE® KIP EM.

The dispersed aqueous phase of a HIPE comprises water, and may also comprise one or more components, such as initiator, photoinitiator, or electrolyte, wherein in certain embodiments, the one or more components are at least partially water soluble.

One component of the aqueous phase may be a water-soluble electrolyte. The water phase may contain from about 0.2% to about 40%, in certain embodiments from about 2% to about 20%, by weight of the aqueous phase of a water-soluble electrolyte. The electrolyte minimizes the tendency of monomers, comonomers, and crosslinkers that are primarily oil soluble to also dissolve in the aqueous phase. Examples of electrolytes include chlorides or sulfates of alkaline earth metals such as calcium or magnesium and chlorides or sulfates of alkali earth metals such as sodium. Such electrolyte can include a buffering agent for the control of pH during the polymerization, including such inorganic counterions as phosphate, borate, and carbonate, and mixtures thereof. Water soluble monomers may also be used in the aqueous phase, examples being acrylic acid and vinyl acetate.

Another component that may be present in the aqueous phase is a water-soluble free-radical initiator. The initiator can be present at up to about 20 mole percent based on the total moles of polymerizable monomers present in the oil phase. In certain embodiments, the initiator is present in an amount of from about 0.01 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, and other suitable azo initiators. In certain embodiments, to reduce the potential for premature polymerization which may clog the emulsification system, addition of the initiator to the monomer phase may be just after or near the end of emulsification.

Photoinitiators present in the aqueous phase may be at least partially water soluble and may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of from about 200 nanometers (nm) to about 800 nm, in certain embodiments from about 200 nm to about 350 nm, and in certain embodiments from about 350 nm to about 450 nm. If the photoinitiator is in the aqueous phase, suitable types of water-soluble photoinitiators include benzophenones, benzils, and thioxanthones. Examples of photoinitiators include 2,2'-Azobis[2-(2-imidazolin-2-yl)propane]dihydrochloride; 2,2'-Azobis[2-(2-imidazolin-2-yl)propane]disulfate dehydrate; 2,2'-Azobis(1-imino-1-pyrrolidino-2-ethylpropane)dihydrochloride; 2,2'-Azobis[2-methyl-N-(2-hydroxyethyl) propionamide]; 2,2'-Azobis(2-methylpropionamidine) dihydrochloride; 2,2'-dicarboxymethoxydibenzalacetone, 4,4'-dicarboxymethoxydibenzalacetone, 4,4'-dicarboxymethoxydibenzalcyclohexanone, 4-dimethylamino-4'-carboxymethoxydibenzalacetone; and 4,4'-disulphoxymethoxydibenzalacetone. Other suitable photoinitiators that can be used in the present invention are listed in U.S. Pat. No. 4,824,765 (Sperry et al.) issued Apr. 25, 1989.

In addition to the previously described components other components may be included in either the aqueous or oil phase of a HIPE. Examples include antioxidants, for example hindered phenolics, hindered amine light stabilizers; plasticizers, for example dioctyl phthalate, dinonyl sebacate; flame retardants, for example halogenated hydrocarbons, phosphates, borates, inorganic salts such as antimony trioxide or ammonium phosphate or magnesium hydroxide; dyes and pigments; fluorescers; filler particles, for example starch, titanium dioxide, carbon black, or calcium carbonate; fibers; chain transfer agents; odor absorbers, for example activated carbon particulates; dissolved polymers; dissolved oligomers; and the like.

HIPE foam is produced from the polymerization of the monomers comprising the continuous oil phase of a HIPE. In certain embodiments, HIPE foams may have one or more layers, and may be either homogeneous or heterogeneous polymeric open-celled foams. Homogeneity and heterogeneity relate to distinct layers within the same HIPE foam, which are similar in the case of homogeneous HIPE foams or which differ in the case of heterogeneous HIPE foams. A heterogeneous HIPE foam may contain at least two distinct layers that differ with regard to their chemical composition, physical properties, or both; for example layers may differ with regard to one or more of foam density, polymer composition, specific surface area, or pore size (also referred to as cell size). For example, for a HIPE foam if the difference relates to pore size, the average pore size in each layer may differ by at least about 20%, in certain embodiments by at least about 35%, and in still other embodiments by at least about 50%. In another example, if the differences in the layers of a HIPE foam relate to density, the densities of the layers may differ by at least about 20%, in certain embodiments by at least about 35%, and in still other embodiments by at least about 50%. For instance, if one layer of a HIPE foam has a density of 0.020 g/cc, another layer may have a density of at least about 0.024 g/cc or less than about 0.016 g/cc, in certain embodiments at least about 0.027 g/cc or less than about 0.013 g/cc, and in still other embodiments at least about 0.030 g/cc or less than about 0.010 g/cc. If the differences between the layers are related to the chemical composition of the HIPE or HIPE foam, the differences may reflect a relative amount difference in at least one monomer component, for example by at least about 20%, in certain embodiments by at least about 35%, and in still further embodiments by at least about 50%. For instance, if one layer of a HIPE or HIPE foam is composed of about 10% styrene in its formulation, another layer of the HIPE or HIPE foam should be composed of at least about 12%, and in certain embodiments of at least about 15.

A HIPE foam having separate layers formed from differing HIPEs, as explained in more detail below, provides a HIPE foam with a range of desired performance characteristics. For example, a HIPE foam comprising a first and second foam layer, wherein the first foam layer has a relatively larger pore or cell size, than the second layer, when used in an absorbent article may more quickly absorb incoming fluids than the second layer. By way of example when used in an absorbent articled the first foam layer may be layered over the second foam layer having relatively smaller pore sizes, as compared to the first foam layer, which exert more capillary pressure and drain the acquired fluid from the first foam layer, restoring the first foam layer's ability to acquire more fluid. HIPE foam pore sizes may range from 1 to 200 μm and in certain embodiments may be less than 100 μm.

HIPE foams of the present invention having two major parallel surfaces may be from about 0.05 to about 10 mm thick and in certain embodiments about 2 mm to about 8 mm thick. The desired thickness of a HIPE will depend on the materials used to form the HIPE, the speed at which a HIPE is deposited on a belt, the intended use of the resulting HIPE foam, the nature of the UV light used for polymerization, photoinitiator type, and amount of photoinitiator used. For example, decreasing the amount of photoinitiator can decrease the light absorption of the emulsion and may increase light penetration.

HIPEs having more than one layer can be produced that allow the UV light to polymerize the whole HIPE to a HIPE foam. For example, a HIPE foam of the present invention may comprise a first layer and a second layer, wherein the first layer is the layer of HIPE foam closest to the UV light source and the second layer the farthest. The first layer can be made in such a manner as to allow the UV light to both polymerize it and pass through to polymerize the second layer. For example, the first layer can be a HIPE having larger aqueous droplets in the aqueous phase, which after polymerization will form the pores or cells of HIPE foam. The larger aqueous droplet size will have less scattering and allow more UV light to pass through the first layer and be available to polymerize the monomers in the second HIPE layer, which has a smaller average aqueous droplet size. The desired properties in a HIPE layer, such as being transparent to the UV light wavelength absorbed by the photoinitiator in the emulsion or larger aqueous droplet size can be produced by modifying the chemical composition of the HIPE layer or modifying the method of making the HIPE layer. In addition, in certain embodiments, the concentration of photoinitiator can be greater in the bottom layer as compared to the top layer, allowing for similar levels of polymerization in both layers, even with reduced UV light in the lower layer. In another embodiment, using different photoinitiators with different UV light absorbencies in the top layer as compared to the bottom layer may also be used to increase the depth of penetration of the UV light. In still another embodiment, a HIPE can be exposed to UV light on both its bottom and top surfaces, which may be accomplished by using a belt, film or both that is mostly transparent to UV light and move the HIPE over a UV light source while also exposing the top of the HIPE to a UV light source. In another example, in the oil phase the type and amounts of monomer can be adjusted or during the formation of the HIPE the shear rate can be increased during the emulsion making process or the amount of time the HIPE is in the emulsion making step can be increased. This is contrasted with what is in the prior art wherein layered foams may be made by polymerizing a sequence of layers, with each new emulsion layer being placed on the previously polymerized layers. This contrasts with the present invention wherein the layers are already present in the HIPE before the HIPE is exposed to UV light to form a HIPE foam.

The HIPE foams of the present invention are relatively open-celled. This refers to the individual cells or pores of the HIPE foam being in substantially unobstructed communication with adjoining cells. The cells in such substantially open-celled HIPE foam structures have intercellular openings or windows that are large enough to permit ready fluid transfer from one cell to another within the HIPE foam structure. For purpose of the present invention, a HIPE foam is considered "open-celled" if at least about 80% of the cells in the HIPE foam that are at least 1 μm in size are in fluid communication with at least one adjoining cell.

In addition to being open-celled, in certain embodiments HIPE foams are sufficiently hydrophilic to permit the HIPE foam to absorb aqueous fluids, for example the internal surfaces of a HIPE foam may be rendered hydrophilic by residual hydrophilizing surfactants or salts left in the HIPE foam following polymerization, by selected post-polymerization HIPE foam treatment procedures (as described hereafter), or combinations of both.

In certain embodiments, for example when used in certain absorbent articles, the HIPE foam may be flexible and exhibit an appropriate glass transition temperature (Tg). The Tg represents the midpoint of the transition between the glassy and rubbery states of the polymer. In general, HIPE foams that have a higher Tg than the temperature of use can be very strong but will also be very rigid and potentially prone to fracture. In certain embodiments, regions of the HIPE foams of the current invention which exhibit either a relatively high Tg or excessive brittleness will be discontinuous. Since these discontinuous regions will also generally exhibit high strength, they can be prepared at lower densities without compromising the overall strength of the HIPE foam. HIPE foams intended for applications requiring flexibility should contain at least one continuous region having a Tg as low as possible, so long as the overall HIPE foam has acceptable strength at in-use temperatures. In certain embodiments, the Tg of this region will be less than about 40° C. for foams used at about ambient temperature conditions, in certain other embodiments, less than about 30° C. For HIPE foams used in applications wherein the use temperature is higher or lower than ambient, the Tg of the continuous region may be no more that about 10° C. greater than the use temperature, in certain embodiments the same as use temperature, and in further embodiments about 10° C. less than use temperature wherein flexibility is desired. Accordingly, monomers are selected as much as possible that provide corresponding polymers having lower Tg's.

The HIPE foams of the present invention may be used as absorbent core materials in absorbent articles, such as feminine hygiene articles, for example pads, pantiliners, and tampons; disposable diapers; incontinence articles, for example pads, adult diapers, homecare articles, for example wipes, pads, towels; and beauty care articles, for example pads, wipes, and skin care articles, such as used for pore cleaning.

Figure 1:
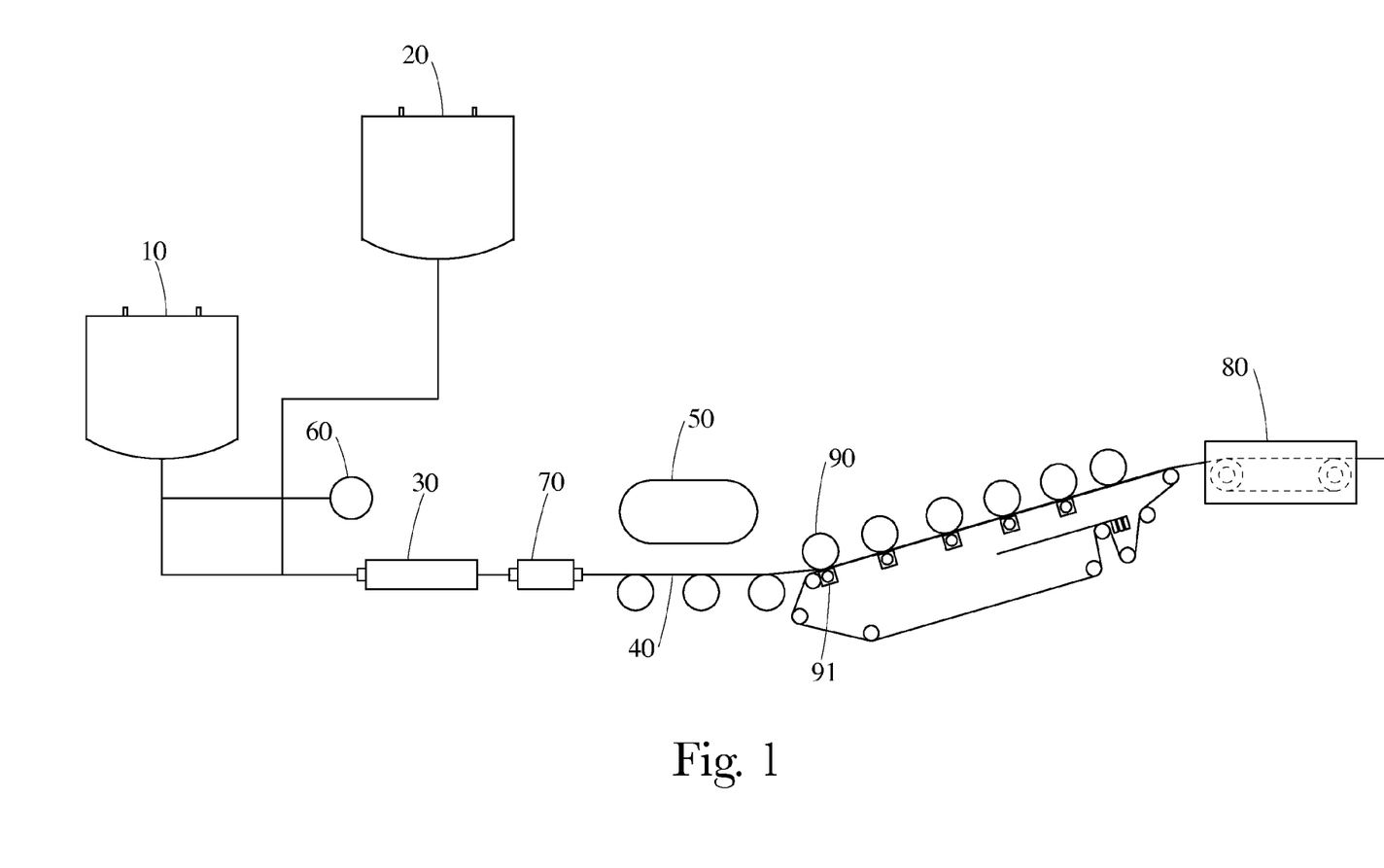
FIG. 1 is a process flow diagram of the present invention.

To produce a HIPE using the above, and shown in FIG. 1, an aqueous phase 10 and an oil phase 20 are combined in a ratio between about 8:1 and 140:1. In certain embodiments, the aqueous phase to oil phase ratio is between about 10:1 and about 75:1, and in certain other embodiments the aqueous phase to oil phase ratio is between about 13:1 and about 65:1. This is termed the "water-to-oil" or W:O ratio and can be used to determine the density of the resulting HIPE foam. As discussed, the oil phase may contain one or more of monomers, comonomers, photoinitiators, crosslinkers, and emulsifiers, as well as optional components. The water phase will contain water and in certain embodiments one or more components such as electrolytes.

In certain embodiments, photoinitiator combinations can be used that have different absorption characteristics, so as one photoinitiator is used up the polymerization continues throughout the depth of the HIPE, allowing increased penetration of the UV light providing a more complete polymerization. In certain embodiments, photoinitiator can be added to the aqueous phase, oil phase, or both and the exposure UV light wavelengths controlled to selectively produce different concentrations of radicals at different points throughout the polymerization process. For example, without being bound by theory, an aqueous phase soluble photoinitiator can be used to provide radicals that will migrate from the aqueous phase to the oil phase to supply a steady, but lower concentration of radicals to the oil phase (compared to the amount of radicals produced using a photoinitiator in the oil phase); resulting in a slower polymerization, but a stronger HIPE foam by reducing the number of radicals produced early in polymerization, leading to longer polymer chain lengths yielding stronger polymer and enabling higher water-to-oil ratios.

The HIPE can be formed from the combined aqueous 10 and oil 20 phases by subjecting these combined phases to shear agitation in a mixing chamber or mixing zone 30. The combined aqueous 10 and oil 20 phases are subjected to shear agitation produce a stable HIPE having aqueous droplets of the desired size. The emulsion making process produces a HIPE where the aqueous phase droplets are dispersed to such an extent that the resulting HIPE foam will have the desired structural characteristics. Emulsification of the aqueous 10 and oil 20 phase combination in the mixing zone 30 may involve the use of a mixing or agitation device such as an impeller, by passing the combined aqueous and oil phases through a series of static mixers at a rate necessary to impart the requisite shear, or combinations of both. Once formed, the HIPE can then be withdrawn or pumped from the mixing zone 30. One method for forming HIPEs using a continuous process is described in U.S. Pat. No. 5,149,720 (DesMarais et al), issued Sep. 22, 1992 and U.S. Pat. No. 5,827,909 (DesMarais) issued on Oct. 27, 1998.

Figure 2:
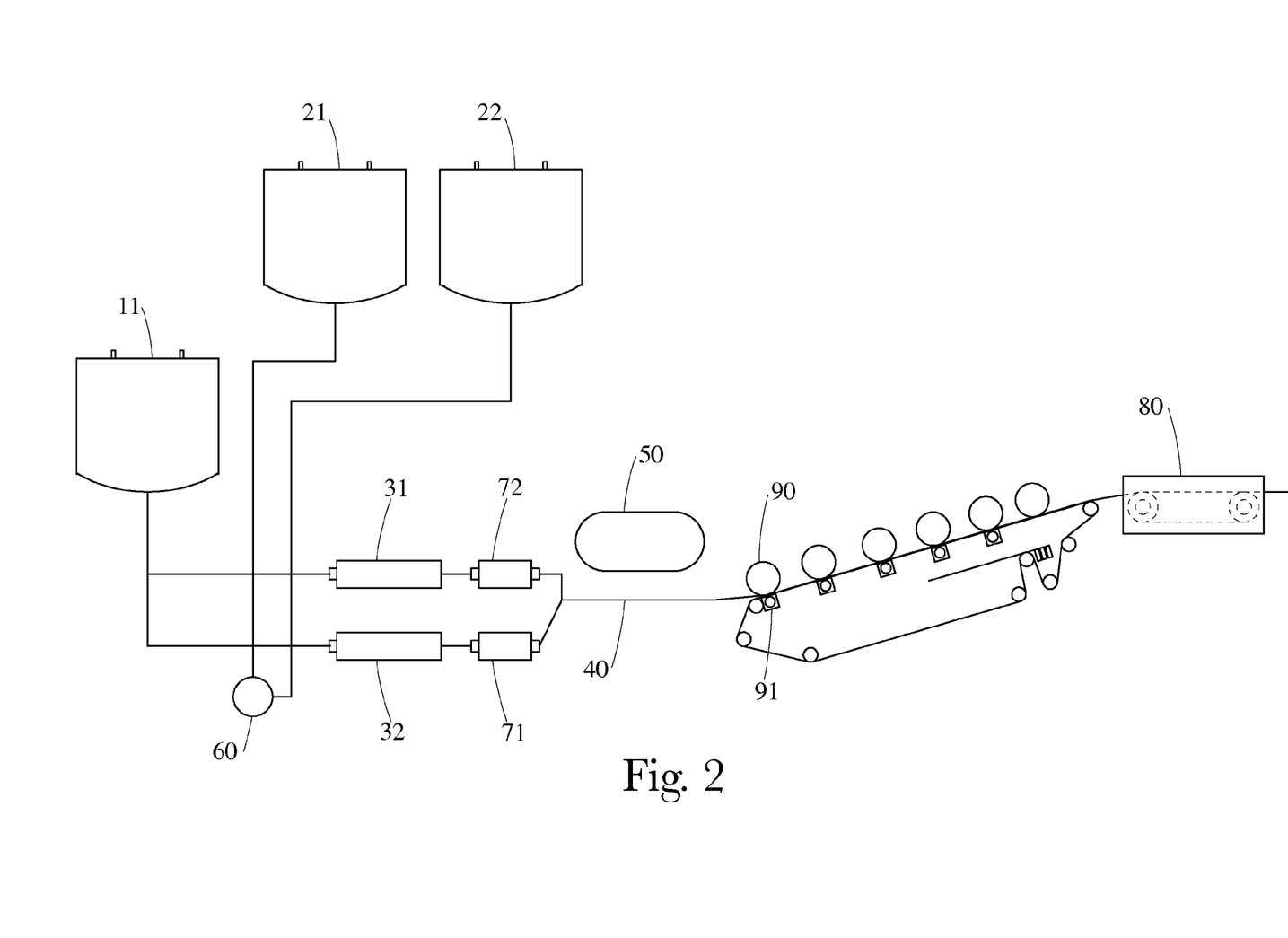
FIG. 2 is a process flow diagram of the present invention.

In certain embodiments, for a continuous process the HIPE can be withdrawn or pumped from the mixing zone 30 and transported to a UV light zone 50 by being deposited on to a belt 40 travelling in a substantially horizontal direction. The HIPE may be deposited on to the belt through one or more devices such as a die, sprayer, or caster. As shown in FIG. 2, in the present invention two or more distinct HIPEs can be produced, which after polymerization will form two or more distinct layers in a HIPE foam, for example a first HIPE and a second HIPE, wherein each HIPE may have an individual composition (aqueous and oil phases) or individual combinations of properties, for example pore dimensions, mechanical properties, and the like, that differs from the other HIPEs. The individual HIPEs can be formed from one or more individual oil phases and one or more individual aqueous phases, and combinations thereof. For example, individual HIPEs can be formed from a single oil phase combined with 2 or more different aqueous phases, or as shown in FIG. 2 a single aqueous phase 11 combined with 2 or more individual oil phases 21, 22.

The individual aqueous 11 and oil phases 21, 22 enter separate mixing zones 31 and 32 and then are deposited the same way as individual HIPEs. For example, in a continuous process of the present invention a first die 71 can deposit one HIPE layer on to a belt 40 then the same die or a second die 72, as shown in FIG. 2, could deposit a second HIPE on top of the first HIPE. In certain embodiments, the top second HIPE may have a lower concentration of photoinitiator as compared to the bottom first HIPE such that a similar amount of radicals is formed in both HIPE layers. In another embodiment using the previously described continuous method a die could deposit HIPEs adjacently on to a belt where the individual HIPEs may or may not overlap each other, or any other means of moving one or more HIPEs from a mixing zone to produce a HIPE foam.

Examples of belt may include endless belts made of one or more metals, a resin, or combinations thereof; or sheet materials such as films that may be positioned on the belt and moving therewith. The average thickness of the HIPE, as measured from the surface of the HIPE that is in contact with the belt to the opposing HIPE surface, can be adjusted by the movement speed of the belt, the flow of HIPE deposited on the belt, or the configuration of one or more devices used to deposit the HIPE on the belt.

The belt can be any thickness or shape suitable for producing a HIPE foam. Further, the surface of the belt upon which the HIPE will be deposited, can be substantially smooth or may comprise depressions, protuberances, or combinations thereof. The protuberances or depressions may be arranged in any formation or order and can be used to provide patterns, designs, markings or the like to HIPE foam. The belt may comprise one or more materials suitable for the polymerization conditions (various properties such as heat resistance, weatherability, surface energy, abrasion resistance, recycling property, tensile strength and other mechanical strengths) and may comprise at least one material from the group including films, non-woven materials, woven materials, and combinations thereof. Examples of films include, fluorine resins such as polytetrafluoroethylene, tetrafluoroethylene-perfluoroalkylvinyl ether copolymers, tetrafluoroethylene-hexafluoropropylene copolymers, and tetrafluoroethylene-ethylene copolymers; silicone resins such as dimethyl polysiloxane and dimethylsiloxane-diphenyl siloxane copolymers; heat-resistant resins such as polyimides, polyphenylene sulfides, polysulfones, polyether sulfones, polyether imides, polyether ether ketones, and para type aramid resins; thermoplastic polyester resins such as polyethylene terephthalates, polybutylene terephthalates, polyethylene naphthalates, polybutylene naphthalates, and polycyclohexane terephthalates, thermoplastic polyester type elastomer resins such as block copolymers (polyether type) formed of PBT and polytetramethylene oxide glycol and block copolymers (polyester type) formed of PBT and polycaprolactone may be used. These materials may be used either singly or in mixed form of two or more materials. Further, the belt may be a laminate comprising two or more different materials or two or more materials of the same composition, but which differ in one or more physical characteristics, such as quality or thickness. In certain embodiments the belt or a film positioned on the belt and moving therewith may be transparent to UV light; allowing the UV light from a UV light source positioned below the belt, film or both to polymerize the monomers in a HIPE foam.

As has been mentioned previously, one of the potential obstacles with using UV light to polymerize a HIPE is providing a suitable amount of UV light to the portions of the HIPE that are closest to the belt surface (bottom portion); as the UV light must pass through the top portions of the HIPE to reach the bottom portion. One potential solution is to provide a belt, such as a belt with a surface that can reflect UV light. The belt surface could reflect the UV light back up through the HIPE increasing the polymerization of the monomer at the belt surface and throughout a HIPE. Further the reflective surface could reduce the amount of UV light needed to polymerize the bottom portion of a HIPE as the reflected UV light would serve to drive polymerization of the bottom portion, reducing the amount of light needed to penetrate the top portion of the HIPE.

Therefore, in certain embodiments, a belt may comprise one or more UV reflective materials. The UV reflective material may be in any form suitable for reflecting UV light, such as a coating, film, reflective particles, or combinations thereof. The UV reflective material can be selected to provide a belt with desired levels of UV reflectivity, and durability for a desired application, such as exposure to the environment of a curing oven.

UV reflective materials may have an initial reflectivity of at least 30% of UV light at a wavelength of about 200 nm to about 450 nm upon initial contact with UV light. In certain embodiments, UV reflective materials may have an initial reflectivity of at least 31%, 32%, 33%, 34%, 35%, 36%, 37%, 38%, 39%, 40%, or more, of UV light. The UV light reflectance can be measured using a UV spectrophotometer, such as a Cary 500 UV/VIS/NIR Spectrophotometer equipped with-a DRA-CA-5500 Integrating Sphere, or comparable instrumentation. A UV reflective material in certain embodiments may maintain an initial reflectivity of at least 30% of UV light at a wavelength of about 200 nm to about 450 nm for a suitable period of time, which may be at least 10 hours of continuous or intermittent UV light, and in certain embodiments up to 20, 30, 40 hours or more of continuous or intermittent UV light.

The UV reflective material may be selected and configured to provide a belt with a desired level of UV reflectivity and a desired level of resistance to UV degradation. The UV light reflective material may be a metal-polymer composite comprising UV reflective metal microparticles dispersed in a thermoplastic polymer resin. The UV reflective material may be aluminum, although any suitable UV reflective materials can be used. Suitable UV reflective materials can include metal or metal alloys, such as stainless steel particles, or non-metal materials such as UV reflective polymer materials. The UV reflective material may be configured as particles, which as explained above may be incorporated directly into the belt as particles, or applied to the belt as a coating containing particles, or layered with a belt as a film material containing particles. The size and density of the particles can be selected to provide desired levels of UV reflectivity, machine processability, and cost-effectiveness. The particles of UV reflective material can have any size suitable to provide the desired level of UV reflectivity, but in certain embodiments may be microparticles, such as microparticles having an average size of about 1 to 100 μm, or from about 15 μm to about 55 μm, including particles having an average size of about 15, 17, 20, 25, 30, 35, 40, 45, 50, 54 or 55 μm.

Any density of particles of UV reflective material can be used that provides a belt with a desired level of UV reflectivity. Various UV reflective compositions having desired levels of UV reflectivity can be formulated using combinations of UV reflective microparticles of different sizes and concentrations. Larger particles, higher concentrations of UV reflective material, or both can provide higher levels of UV reflectivity; smaller particles and lower concentrations of UV reflective material can provide lower levels of UV reflectivity. UV reflective materials typically reflect UV radiation at various wavelengths.

As shown in FIG. 2, a belt 40 moves the HIPE into a UV light zone 50 where the monomers present in the HIPE are polymerized. Without being bound by theory, it is believed that HIPE foam formation comprises two overlapping processes. These are the polymerization of the monomers and the formation of crosslinks between active sites on adjacent polymer backbones. As used herein the term "polymerize" as in to polymerize monomers to form a HIPE foam encompass both polymerization of monomers and formation of crosslinks between active sites on adjacent polymer backbones. Crosslinking provides HIPE foams with strength and integrity that is helpful to their further handling and use. In certain embodiments, polymerization can be initiated prior to reaching the UV light zone 50 by, for example, preparing the HIPE at a temperature sufficient to begin polymerization. However, the HIPE is polymerized beyond the point of shapability or moldability in the UV light zone 50.

The present invention relates to using ultraviolet (UV) light to polymerize monomers in the oil phase of a HIPE. An example of a source of UV light is a UV lamp. There may be one or more sources of UV light used to polymerize the HIPE monomers. A UV light source may be positioned above or below the belt. The sources may be the same or differ. For example, the sources may differ in the wavelength of the UV light they produce or in the amount of time a HIPE is exposed to the UV light source. For example, along a continuous HIPE production pathway a HIPE could be exposed to a first UV light source that emits UV light having longer wavelengths. The longer UV light wavelengths serve to penetrate the layers of the HIPE so as to polymerize the bottom portions of the HIPE. The next or second UV light source the HIPE is exposed to emits UV light having a shorter wavelength, so as to polymerize the topmost layer or portions of the HIPE. Therefore UV light sources could be arranged along the continuous production pathway in such a manner that each UV light source provides a separate but complimentary HIPE polymerization function. For instance a HIPE produced in a continuous process could be exposed to a first UV light source that emits UV light in a wavelength range of from about 300 nm to about 450 nm. The HIPE could then be exposed to a separate second UV light source that emits UV light in a wavelength of from about 200 nm to about 300 nm. Photoinitiation of monomer polymerization may be started by subjecting the HIPE foam containing unpolymerized monomers, and one or more photoinitiators, to UV light. The UV light wavelength in the range from about 200 nm to about 800 nm, and in certain embodiments from about 250 nm to about 450 nm, overlaps to at least some degree with the UV light absorption band of the photoinitiator and is of sufficient intensity and exposure duration to substantially complete the polymerization of the unpolymerized monomers.

In certain embodiments, of the present invention can be rapidly polymerized using UV light. After being exposed to UV light HIPEs may be polymerized in less than 20 min, less than 10 minutes, less than 5 minutes, less than 1 min, less than 30 seconds, or less than 15 seconds. The time of exposure of a HIPE foam to UV light in a continuous process is measured by when a 1 cm long portion, as measure in the machine direction, of the HIPE foam enters and then exits the UV light zone. This rapid polymerization allows a wide variety of HIPE compositions to be used. Because polymerization can occur quickly with the methods of the present invention, a HIPE need only be stable for a short period of time, for instance up to several minutes.

Following polymerization the resulting HIPE foam is saturated with aqueous phase that needs to be removed to obtain substantially dry HIPE foam. In certain embodiments, HIPE foams can be squeezed free of most of the aqueous phase by using compression, for example by running the HIPE foam through one or more pairs of nip rollers 90. The nip rollers 90 can be positioned such that they squeeze the aqueous phase out of the HIPE foam. The nip rollers 90 can be porous and have a vacuum applied from the inside such that they assist in drawing aqueous phase out of the HIPE foam. In certain embodiments, nip rollers 90 can be positioned in pairs, such that a first nip roller 90 is located above a liquid permeable belt 40, such as a belt 40 having pores or composed of a mesh-like material, and a second opposing nip roller 91 facing the first nip roller 90 and located below the liquid permeable belt 40. One of the pair, for example the first nip roller 90 can be pressurized while the other, for example the second nip roller 91, can be evacuated, so as to both blow and draw the aqueous phase out the of the HIPE foam. The nip rollers may also be heated to assist in removing the aqueous phase. In certain embodiments, nip rollers are only applied to non-rigid HIPE foams, that is HIPE foams whose walls would not be destroyed by compressing the HIPE foam. In yet a further embodiment, the surface of the nip rollers may contain irregularities in the form of protuberances, depressions, or both such that a HIPE foam can be embossed as it is moving through the nip rollers. When the HIPE has the desired dryness it may be cut or sliced into a form suitable for the intended application.

In certain embodiments, in place of or in combination with nip rollers, the aqueous phase may be removed by sending the HIPE foam through a drying zone 80 where it is heated, exposed to a vacuum, or a combination of heat and vacuum exposure. Heat can be applied, for example, by running the foam though a forced air oven, IR oven, microwave oven or radiowave oven. The extent to which a HIPE foam is dried depends on the application. In certain embodiments, greater than 50% of the aqueous phase is removed. In certain other embodiments greater than 90%, and in still other embodiments greater than 95% of the aqueous phase is removed during the drying process.

EXAMPLES

Preparation of High Internal Phase Emulsions (HIPE) and their subsequent polymerization into absorbent foams are illustrated in the following example. The HIPE sample comprised a single layer having an average pore size of about 30 microns.

HIPE Components:

To prepare the HIPE sample the aqueous phase, oil phase, and initiator contained the following components as shown below in Table 1.

TABLE 1

| Oil Phase | % Amount Based on Total Weight of Oil Phase |
| --- | --- |
| 2-ethylhexyl acrylate (EHA) | 36.7% |
| 2-ethylhexyl methacrylate (EHMA) | 37.61% |
| ethyleneglycol dimethacrylate (EGDMA) | 17.43% |
| dimethyl ammonium methyl sulfate (DTDMAMS) | 0.93% |
| Polyglycerol succinate (PGS) | 6.48% |
| Photoinitiator - Darocur 1173* | 0.99% |

| Aqueous Phase | % Amount Based on Total Weight of Aqueous Phase |
| --- | --- |
| $CaCl_2$ | 3.85% |
| Water:oil ratio | 27:1 |

*BASF Corporation, Florham Park, NJ

Equipment:

The HIPE is prepared in equipment comprising static mixers and a recirculation pump. The static mixers are manufactured by Sulzer (Sulzer Ltd. Zürcherstrasse 14, 8401 Winterthur, Switzerland). Forty-eight elements of SMX style mixers, sized to fit within a standard 1.5" diameter pipe were used as the primary mixing loop elements. Four sets of twelve elements welded so that each sequential segment is rotated 90° are fitted into independent sections of pipe fitted with 2" tri-clover quick disconnect piping flanges.

The aqueous phase is introduced into a recirculation loop via a modified 1⅞" tubing 90° elbow with 2" tri-clover quick disconnect piping flanges, with a ½" pipe welded into the elbow to form an annulus such that the aqueous phase is entering the discharge end of the elbow, concurrent with the recirculation flow, both proceeding vertically downward. The end of the annular ½" pipe is internally threaded and a set screw with a 17/64" hole drilled in it to direct the aqueous incoming flow toward the static mixers.

Three sections of the SMX containing pipes, vertically oriented, follow the aqueous introduction elbow. Then the flow is directed by two elbows, both 1⅞" tubing elbows with tri-clover fittings, first a 90° and then a 45°. The final section of SMX mixers is connected upward at a convenient angle to have its discharge at about the same elevation as the inlet fittings to the recirculation pump.

The discharge from the final SMX mixer segment goes through a conical reducer to a ⅞" Tee. (Tee A). One side of the Tee is connected to a same diameter elbow fitted with a temperature probe, which then connects to another ⅞" Tee (Tee B). One side of Tee B connects to a Teflon lined hose 1¼" in diameter and 48" long. The hose connects to the stem side of a ⅞" Tee (Tee C). One side of Tee C's cross piece is connected upwardly to the inlet of the recirculation pump, a Waukesha Model 030 U2 lobe pump (Waukesha Chemy-Burrell Company, Delavan, Wis.). The other side of Tee C's cross piece in connected downwardly to a ⅞" to ⅝" conical reducer. The small end of the conical reducer uses a ¾" tri-clover connection to a custom made section of ⅜" stainless steel tubing with a ¾" tri-clover fitting welded onto the tube by first drilling a matching diameter hole in a ¾" tri-clover end cap. This allows the tube to project into and past the intersection of the stem side of Tee C to the cross piece of Tee C. The end of the tube projecting inward toward the Waukesha pump is internally threaded and fitted with a set screw into which a 7/64" hole has been drilled. The other end of the tube is fitted with a ¾" tri-clover fitting facing downward fabricated in the same way as mentioned above.

The discharge from the Waukesha pump transfers to a 1⅜" diameter by 6" spool piece with a small port for a temperature probe and tri-clover sanitary fittings, followed by six elements of 1¼" Kenics helical static mixers (Chemineer Inc., Dayton, Ohio) in a section of pipe just long enough to contain them, with ends fitted with tri-clover fittings. Next is a 1⅜" 90° tubing elbow with tri-clover fittings, a 1⅜" diameter by 6" spool piece, a second 1⅜" diameter by 6" spool piece fitted with a means to vent gasses from this, the high spot of the total first stage mixing assembly, and then a 1⅜ to 1⅞" conical spool piece connected to the aqueous injector elbow mentioned above. This completes the description of the mixing stage for the small celled emulsion.

It has been found that the supply pumps or the recirculation pump can lead to cyclic pulsations of flow. To mitigate that behavior, the free end of Tee A in the above description can be connected to a surge dampener assembly containing a pressure transducer to monitor pressures and a chamber which can be vented to allow for different volumes of air to be maintained in the chamber in order to dampen the pressure fluctuations.

The discharge from the mixing stage issues from Tee B through a Teflon lined 1¼" braided steel hose to a 1" piping elbow fitted with a similar injector tube arrangement to the aqueous injector elbow described above, but with ⅜" tubing instead of ½", and fitted with a set screw with a 3/32" drilled hole. The initiator solution is introduced through this arrangement. The discharge of the HIPE and the centrally introduced, collinear initiator stream flow are directed to a series of three segments of twelve elements of SMX mixers sized to fit in a 1" pipe section with tri-clover fittings. The flow then proceeds through a conical reducer into a custom coat hanger style die. The die then deposits the HIPE unto an endless belt moving at a speed of 10 meters per minute.

HIPE Formation:

To start this equipment, aqueous phase is heated to about 8° C. and delivered to the aqueous injector point described above at a flow rate of about 2 liters/minute to conveniently fill the equipment and to pre heat the equipment to a temperature indicated by the temperature indicating devices with the loop of about 65 C. The Waukesha pump is started at a theoretical rate of 2 liters per minute when aqueous phase is observed to be coming out of the die, which is higher than the pump, so that the pump is not run dry.

When the equipment temperature is reached, the oil phase is then delivered to the oil phase injector at a rate of 0.5 kilograms/minute. (Aqueous phases are metered in liters per minute and the oil phase is referred to in kilograms per minute in order to describe the theoretical density of the cured emulsion. This also means that one can change the salt concentration or salt type in the aqueous phase and still make the same density product without re-calculating flow rates in kilograms to accomplish the desired product). The water to oil ratio at this stage of startup is then 4:1. After a period of about 5 minutes from the first introduction of oil phase, low viscosity HIPE can be observed issuing from the die. At that point the aqueous temperature setpoint is adjusted to about 72 C and the flow rate is uniformly increased from 2 liters per minute to 8.107 liters per minute over a period of 3 minutes. Only the aqueous phase temperature is controlled, since it is >92% of the total mass of emulsion. The recirculation pump, starting simultaneously with the start of the increase in aqueous phase flow, is uniformly increased in speed to yield a pumping rate of 28 liters per minute over a period of 2 minutes. The oil phase flow, also beginning at the same time as the increase in aqueous phase flow, is decreased uniformly to a flow rate of 0.313 kg/minute over a period of 5 minutes. Sodium acrylate flow at 0.031 liters/minute is comingled with the aqueous flow prior to the introduction to the mixing loop and is generally started during the aqueous flow rate ramp. At equilibrium, the water to oil ratio at the discharge from the recirculation loop is 27:1. The HIPE issuing from the die at the end of the flow ramps is very thick and very white.

A sample of the HIPE was dispensed into a 2" long×2" wide×4 mm deep container and placed underneath a medium-pressure mercury vapor lamp (UV Bulb: 250 mm long, 600 Watts/inch max medium pressure mercury vapor lamp; MonoCure UV Curing System available from UV Systems Group of Nordson Corporation, Amherst, Ohio). The container was completely filled with the HIPE. The top surface of the container was at a 2" distance from the bottom surface of the lamp housing. The lamp power was set at 200 Watts/inch with lamp intensity and dose as given in Table 2. The UV light measurements were taken with a Power Puck (10 Watt, EIT, Sterling, Va.). The surface of the sample was not covered. The lamp had been turned on and off intermittently for certain periods of time until a total light exposure time of 5 minutes was achieved (this time does not include the time when the lamp was off). The lamp on/off regimen was as follows: 10 seconds/10 seconds for the first 120 seconds of experiment and 20 seconds/20 seconds for the rest 480 seconds of experiment. During and after the experiment the surface of the sample was smooth and there were no signs of discoloration, bubbles or surface imperfections. At this point, the sample was taken away from the lamp and carefully observed. Observations were done during the treatment procedure when the lamp had been off. The changes in the sample properties had been followed visually by observations and by touching the sample with a stainless steel spatula. Skin formation at the surface of the sample, which provided evidence of monomer polymerization, had been observed after 2 minutes of UV light exposure. The entire thickness of the sample had been polymerized in about 4 minutes of UV light exposure. Water could be easily squeezed out of the polymerized sample by pressing on it with a spatula.

TABLE 2

| | First UV Lamp | |
|---|---|---|
| Spectral Range | Joules/cm$^2$ | Watts/cm$^2$ |
| UVA | 48.06 | 0.16 |
| UVB | 86.79 | 0.29 |
| UVC | 15.21 | 0.05 |
| UVV | 22.95 | 0.23 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing a High Internal Phase Emulsion foam comprising the steps of:
   forming a first High Internal Phase Emulsion from
      an oil phase comprising monomer, cross-linking agent, emulsifier;
      an aqueous phase; and
      photoinitiator;
   forming a second High Internal Phase Emulsion from
      an oil phase comprising monomer, cross-linking agent, emulsifier;
      an aqueous phase; and
      photoinitiator;

depositing the first High Internal Phase Emulsion on a belt;
depositing the second High Internal Phase Emulsion on the first High Internal Phase Emulsion;
producing a High Internal Phase Emulsion foam by polymerizing the monomers of the first and second High Internal Phase Emulsion by exposing the first and second High Internal Phase Emulsion to UV light provided by a UV light source;
wherein the first layer allows UV light to reach the second layer so that the first layer or second layer are capable of being polymerized simultaneously; and
wherein the belt comprises a UV reflective material in the form of microparticles having an average size of about 1 to 100 μm.

2. The method of claim 1, wherein the UV reflective material has an initial reflectivity of at least 30% of UV light at a wavelength of about 200 nm to about 450 nm upon initial contact with UV light.

3. The method of claim 1, wherein the belt comprises a UV transparent film.

4. The method of claim 3, wherein the UV light is provided by a UV light source positioned above the belt and a UV light source positioned below the belt.

5. The method of claim 1, wherein the first High Internal Phase Emulsion has a lower concentration photoinitiator than the second High Internal Phase Emulsion.

6. The method of claim 1, wherein the first High Internal Phase Emulsion comprises a photoinitiator having a different UV light absorbency than a photoinitiator in the second High Internal Phase Emulsion.

7. The method of claim 1, wherein the belt comprises at least one of protuberances or depressions.

8. The method of claim 1, wherein the belt comprises at least one of films, non-woven materials, or woven materials.

9. The method of claim 8, wherein the belt comprises at least one of fluorine resins, silicone resins, polyimides, polyphenylene sulfides, polysulfones, polyether sulfones, polyether imides, polyether ether ketones, para type aramid resins; thermoplastic polyester resins, or thermoplastic polyester type elastomer resins.

10. The method of claim 9, wherein the belt comprises at least one of polytetrafluoroethylene, tetrafluoroethylene-perfluoroalkylvinyl ether copolymers, tetrafluoroethylene-hexafluoropropylene copolymers, tetrafluoroethylene-ethylene copolymers, dimethyl polysiloxanes, dimethylsiloxane-diphenyl siloxane copolymers, polyethylene terephthalates, polybutylene terephthalates, polyethylene naphthalates, polybutylene naphthalates, polycyclohexane terephthalates, polyether block copolymers, or polyester block copolymers.

11. The method of claim 1, wherein the UV light is in the wavelength range of from about 200 nm to about 800 nm.

12. The method of claim 1, wherein the source of UV light is a UV lamp.

13. The method of claim 1, wherein the UV light is provided by at least two UV light sources; wherein the at least two UV light sources emit UV light in differing wavelength ranges.

14. The method of claim 13, wherein there is a first UV light source emitting UV light in the wavelength of from about 300 nm to about 450 nm and there is a second UV light source emitting UV light in the range of from about 200 nm to about 300 nm.

* * * * *